United States Patent [19]

Phillips

[11] Patent Number: 5,255,715
[45] Date of Patent: Oct. 26, 1993

[54] CONTROL VALVE HAVING PARALLEL DIVERSIONARY SLOTS INTERCONNECTED BY FLOW SELECTIVE CONTROL ORIFICES

[75] Inventor: Edward H. Phillips, Troy, Mich.

[73] Assignee: Techco Corporation, Troy, Mich.

[21] Appl. No.: 945,520

[22] Filed: Sep. 16, 1992

[51] Int. Cl.$^5$ .............................................. F15B 11/08
[52] U.S. Cl. ........................... 137/625.23; 137/625.24; 91/375 R
[58] Field of Search ................. 137/625.21, 625.22, 137/625.23, 625.24; 91/375 A, 375 R

[56] References Cited

U.S. PATENT DOCUMENTS

| | | |
|---|---|---|
| 4,460,016 | 7/1984 | Haga et al. . |
| 4,651,551 | 3/1987 | Bishop et al. . |
| 4,922,803 | 5/1990 | Phillips . |
| 4,924,910 | 5/1990 | Tabata et al. . |
| 4,956,590 | 9/1990 | Phillips . |
| 5,072,650 | 12/1991 | Phillips . |
| 5,103,715 | 4/1992 | Phillips . |

OTHER PUBLICATIONS

SAE TEchnical Paper 880707, 1988 Lincoln Continental Variable-Assist Power Steering System, J. J. Duffy, Copyright 1988 Society of Automotive Engineers, Inc.

*Primary Examiner*—Alan Cohan
*Attorney, Agent, or Firm*—Gifford, Groh, Sprinkle, Patmore and Anderson

[57] ABSTRACT

An improved open-center improved valving sub-assembly of the type used for power steering systems for motor vehicles is disclosed. In particular, the improved open-center improved valving sub-assembly has a valve spool member with first and second sets of input slots and first and second sets of return slots, and a valve sleeve member with output slots and diversionary slots wherein only the output slots are coupled to a power cylinder member of a host power steering system. The output slots are linked fluidically to the first sets of input and return slots by input and return flow control orifices each comprising overlapping tangentially disposed areas therebetween. The diversionary slots are linked fluidically to the second sets of input and return slots by input and return flow selective control orifices each comprising overlapping tangentially disposed areas therebetween. The input and return flow selective control orifices are tangentially shorter in length than the input and return flow control orifices whereby corresponding sets of the input and return flow selective control orifices close before corresponding sets of the input and return flow control orifices as the valve spool member is moved rotationally with respect to the valve sleeve member.

1 Claim, 5 Drawing Sheets

_Fig-8A_

_Fig-8B_

CONTROL VALVE HAVING PARALLEL DIVERSIONARY SLOTS INTERCONNECTED BY FLOW SELECTIVE CONTROL ORIFICES

BACKGROUND AND SUMMARY OF THE INVENTION

The present invention relates generally to open-center control valves commonly utilized in power steering systems and, more particularly, to such open-center control valves having diversionary slots positioned hydraulically in parallel with their output slots.

In power steering systems, it is desirable to provide the control valve with a static pressure-effort characteristic having desirable on-center effort combined with relatively rapid boost recovery at moderate valve deflection angles. Reaction control valves featuring on-center detent mechanisms are known to provide such characteristics. However, they are typically deemed to be too expensive for use in high volume applications. Accordingly, a first preferred embodiment of the present invention is directed to providing a control valve wherein secondary portions of the hydraulic fluid flowing therethrough are selectively diverted by flow selective diversionary control orifices to diversionary slots in order to provide the above noted characteristics. Generally, the diverted secondary portion of hydraulic fluid decreases in value with increasing values of valve deflection angle. As a side benefit this also provides a more stable pattern of dynamic pressure-effort characteristics whereby significantly increased values of steering effort are required to effect positive values of steering motion.

The use of diversionary slots is known in the art. Generally, they are differently configured and are utilized for other purposes. By way of example, diversionary slots are utilized in conjunction with oversized control orifices in implementing the high speed features of the power steering valves described in SAE Paper 880707 entitled 1988 "LINCOLN CONTINENTAL VARIABLE-ASSIST POWER STEERING SYSTEM" and U.S. Pat. No. 4,651,551 entitled "MEANS FOR MANUFACTURING COMPONENTS OF ROTARY VALVES", issued to Bishop et al. on Mar. 24, 1987. In the power steering valves described in SAE Paper 880707 and U.S. Pat. No. 4,651,551, the diversionary slots become overwhelmingly flow dominant whenever a parallel supplemental flow circuit comprising them is activated at high vehicular speeds. While this enables the speed sensitive steering features of the power steering valve described in SAE Paper 880707 and U.S. Pat. No. 4,651,551, it also severely reduces available fluid flow to that valve's output slots and precludes a normal range of steering motion at low values of applied steering effort. For this reason the supplemental flow circuit can not be fully activated until the host vehicle attains very high speeds (i.e., in excess of 60 mph) where a full range of steering motions is not normally required.

While this limitation is significantly ameliorated in the control valve of the first preferred embodiment of the present invention because of its significantly reduced fraction of diverted hydraulic fluid, there is some residual reduction in available load flow at low values of applied steering effort. Accordingly, in another preferred embodiment of the present invention small transverse slots known as parasitic slots are positioned in parallel with selected ones of the control valve's input or return flow distribution slots. The parasitic slots overlap the control valve's output slots thus forming parasitic flow orifices which provide a selectively variable "leak" across the output slots, and therefore, the host steering system's power cylinder. Putting the "leak" across the power cylinder provides additional flow between left and right portions of the power cylinder at low values of applied steering effort which restores the full range of steering motion and results in enhanced steering return characteristics. Additional parasitic slots can be positioned in parallel with other selected ones of the control valve's input or return flow distribution slots to form additional parasitic flow orifices interconnecting the diversionary slots. This enables further tailoring of the diversionary function in order to maintain sustained levels of apparent system damping.

Other features, objects and advantages of the present invention will become readily apparent to one skilled in the art upon analysis of the following written description taken in conjunction with the accompanying drawings and appended claims.

DETAILED DESCRIPTION OF THE PREFERRED EMBODIMENTS

Figure 1:
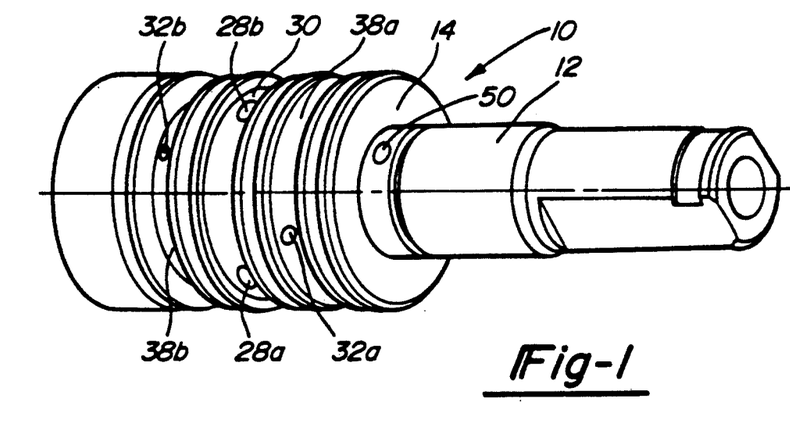
FIG. 1 is a perspective drawing of an improved valving sub-assembly of a control valve according to a first preferred embodiment of the present invention.
Figure 2:
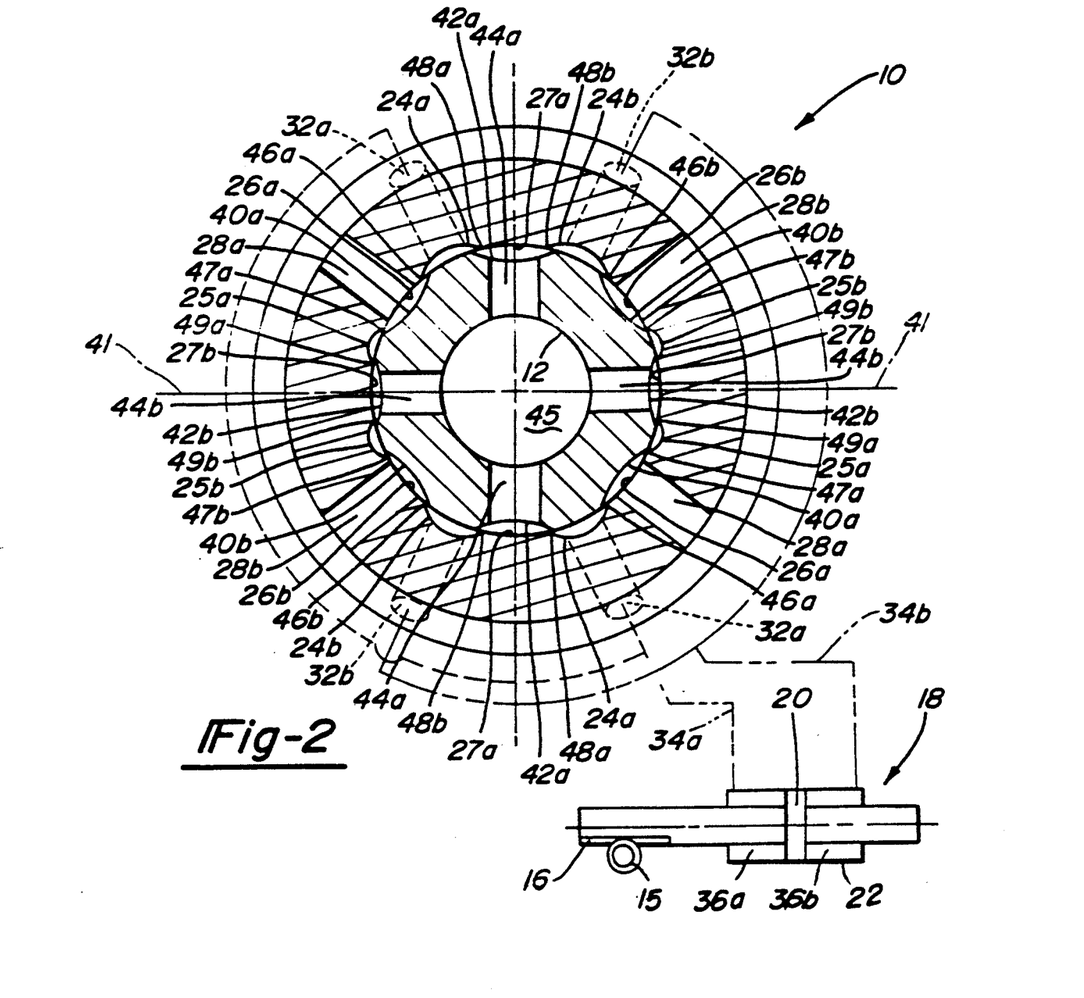
FIG. 2 is a transverse sectional view illustrating the relative positioning of input, return, output and diversionary slots in the improved valving sub-assembly of FIG. 1.

With particular reference to FIGS. 1 and 2 of the drawings, an improved valving sub-assembly 10 is shown to include a valve spool 12 and a valve sleeve 14. As will be appreciated, the specific physical configuration of the improved valving sub-assembly 10 shown is an exemplary one. Generally, its configuration and outline dimensions are chosen to be substantially identical to that of a standard valving sub-assembly of a host power steering system's control valve. Thus, a control valve formed with an axial configuration (as opposed to the rotary one depicted in FIG. 1) could be modified according to the teachings of the present invention as well. A generic improved valving sub-assembly depicted herein as improved valving sub-assembly 10 may be retrofitably utilized in place of the standard valving sub-assembly of the control valve of any host power steering system. An example of such a control valve is that shown and described in U.S. Pat. No. 4,460,016 entitled ROTARY SERVOVALVE by Haga et al. and issued on Jul. 17, 1984.

As noted above, valving sub-assembly 10 includes valve sleeve 14 and a valve spool 12 received therein, and which are rotatable with respect to each other within the control valve. As is known, the rotational position of valve sleeve 14 is coupled to a pinion shaft 15 which is supported within the host vehicle's power steering control apparatus and which is meshingly coupled with a rack shaft 16 of a power steering piston/rack assembly 18. As is also known, the opposite ends of rack shaft 16 are operably connected to the host vehicle's dirigible wheel assemblies via suitable steering linkage mechanisms in a conventional manner. As is schematically shown in FIG. 2, rack shaft 16 is operably connected to a piston 20 that is movable within a power cylinder 22 of piston/rack assembly 18.

Valve sleeve 14 includes a plurality of axially extending valve slots 24 and 25 formed circumferentially about its inner surface. For clarity purposes, the valve slots 24 are hereinafter referred to as first and second output slots 24a and 24b, respectively, and the valve slots 25 are hereinafter referred to as first and second diversionary slots 25a and 25b, respectively. The tangential spacing between first output slots 24a and first diversionary slots 25a defines first inlet lands 26a and the tangential spacing between second output slots 24b and second diversionary slots 25b defines second inlet lands 26b. The tangential spacing between first and second output slots 24a and 24b, respectively, defines first outlet lands 27a and the tangential spacing between first and second diversionary slots 25a and 25b defines second inlet lands 27b. First and second supply or input ports 28a and 28b, respectively, are formed through first and second inlet lands 26a and 26b which fluidically communicate with a housing pump port (not shown) formed in the control valve housing via an annular groove 30 formea in the exterior surface of valve sleeve 14. In addition, first and second output ports 32a and 32b, respectively, are formed in valve sleeve 14 and open at the bottom of first and second valve output slots 24a and 24b, respectively, and communicate with load lines 34a and 34b, respectively. Output ports 32a and 32b are fluidly in communication with left and right chambers 36a and 36b, respectively, of power cylinder 22 via load lines 34a and 34b, respectively. More specifically, output ports 32a and 32b are fluidically coupled to their respective load lines 34a and 34b via annular output grooves 38a and 38b, respectively, formed in valve sleeve 14 and their respective distribution ports (not shown) formed in the control valve housing.

The circumferential exterior surface of valve spool 12 is formed with a plurality of first and second inlet slots 40a and 40b, respectively, which angluarly correspond to first and second input ports 28a and 28b, respectively, formed through first and second inlet lands 26a and 26b, respectively, of valve sleeve 14. In addition, valve spool 12 is also formed to include a plurality of first and second return slots 42a and 42b, respectively, which are angularly aligned with first and second outlet lands 27a and 27b, respectively. First and second exhaust ports 44a and 44b, respectively, provided fluid communication between first and second return slots 42a and 42b, respectively, and internal chamber 45 for permitting the returning load flow to be delivered to a reservoir (not shown) in a conventional manner.

In operation, hydraulic fluid enters improved valving sub-assembly 10 from a housing input port (not shown) via annular groove 30 and input ports 28a and 28b formed in the valve sleeve 14. The hydraulic fluid then flows through inlet slots 40a and 40b, respectively, formed in the valve spool 12. Often inlet slots 40a and 40b are individually non-symmetric. However, they are formed as mirror images of each other about plane 41. Thus, the hydraulic fluid flows in mirror image fashion about plane 41. Primary fluid flow is away from the plane 41 and passes through first and second output slots 24a and 24b, respectively, formed in the valve sleeve 14 via first and second input flow control orifices 46a and 46b, respectively. Secondary flow is toward the plane 41 and passes through first and second diversionary slots 25a and 25b, respectively, also formed in the valve sleeve 14 via first and second input flow selective control orifices 47a and 47b, respectively. Any load flow demanded by the system goes through one set of first and second output ports 32a and 32b, respectively, the corresponding ones of first and second annular output grooves 38a and 38b, respectively, (shown in FIG. 1) and housing output ports (not shown), and returns through the others of the housing output ports, first and second annular output grooves 38a and 38b, respectively, and first and second output ports 32a and 32b, respectively. Returning flow passes through first and second return flow control orifices 48a and 48b, respectively, and first and second return flow selective control orifices 49a and 49b, respectively, to return slots 42a and 42b, respectively. It then flows through exhaust ports 44a and 44b, and out return port 50 (shown in FIG. 1) wherefrom it flows through a housing return port (not shown).

Figure 3A:
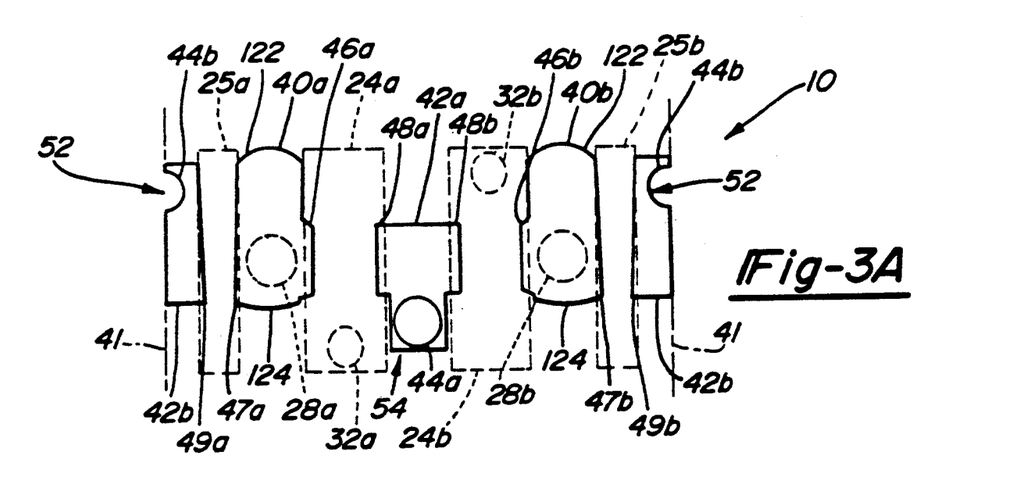
FIGS. 3A, 3B and 3C are descriptive drawings illustrating configurations of input slots, output slots, diversionary slots and return slots of the improved valving sub-assembly of FIG. 1 for non-deflected, left turn and right turn conditions, respectively.
Figure 3B:
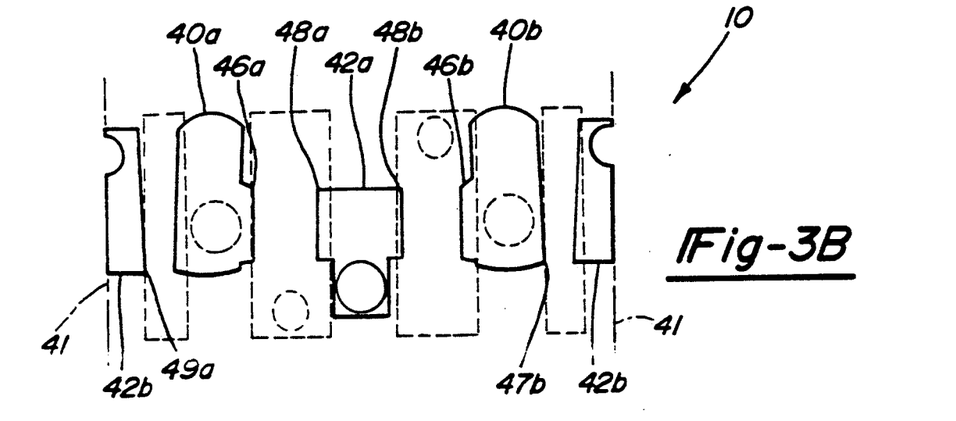
Figure 3C:
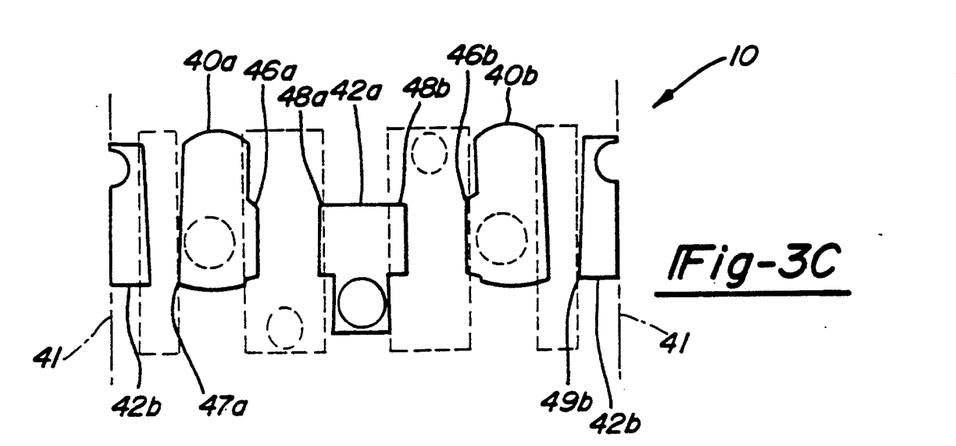

With reference now to FIGS. 3A, 3B and 3C of the drawings, the relative relationship of the various slots and orifices described above is descriptively shown in developed views depicting either symmetrical half (i.e., portions thereof located either above or below plane 41) of improved valving sub-assembly 10. In FIGS. 3A, 3B and 3C ports and slots formed in valve spool 12 are depicted as solid lines, ports and slots formed in valve sleeve 14 are depicted as dashed lines and the flow control and flow selective control orifices comprise overlapping areas therebetween. As described above, hydraulic fluid flows in through input ports 28a and 28b and then through inlet slots 40a and 40b, respectively. Primary fluid flow is away from plane 41 and passes through first and second output slots 24a and 24b, respectively, via first and second input flow control orifices 46a and 46b, respectively. Secondary flow is toward the plane 41 and passes through first and second diversionary slots 25a and 25b, respectively, via first and second input flow selective control orifices 47a and 47b, respectively. Any load flow demanded by the system goes through one set of first and second output ports 32a and 32b, respectively, and returns through the other set of first and second output ports 32a and 32b, respectively. Returning flow passes through first and second return flow control orifices 48a and 48b, respectively, and first and second return flow selective control orifices 49a and 49b, respectively, to return slots 42a and 42b, respectively. It then flows through exhaust ports 44a and 44b. As mentioned above, inlet slots 40a and 40b are formed in a non-symmetric manner such that input flow control orifices 46a and 46b differ significantly in configuration from input flow selective control orifices 47a and 47b.

FIG. 3A depicts inlet slots 40a and 40b, and return slots 42a and 42b as located in a centered position within the corresponding ones of output slots 24a and 24b and diversionary slots 25a and 25b, respectively, as would be the case when the improved valving sub-assembly 10 is in a non-deflected condition (i.e., as would be consistent with straight ahead driving of a host vehicle). It can be seen that input flow selective control orifices 47a or 47b and return flow selective control orifices 49b or 49a, respectively, are laterally shorter than and will therefore close before the input flow control orifices 46b or 46a, respectively, and return flow control orifices 48a or 48b, respectively, respectively. Furthermore, the input and return flow selective control orifices 47a and 47b, and 49b and 49a, respectively, are usually configured so that their area closure rate is of order higher than one in order to smoothly terminate flow therethrough. As depicted in FIG. 3A, the orifices are triangular in shape and thus have an area closure rate of order two. In general they could have curvilinear shapes which would result in other area closure rates.

With reference again to FIG. 2, it can be seen that all of the inlet and return slots 40a and 40b, and 42a and 42b, and output and diversionary slots 24a and 24b, and 25a and 25b, respectively, are formed with smooth transverse contours. This is done in order to minimize valve noise. In addition, it is important to locate output ports 32a and 32b, respectively, as well as exhaust ports 44a and 44b where they will not be subject to high intensity hydraulic fluid flow jets issuing from any of the orifices. As can be seen from FIG. 3A, the first and second output ports 32a and 32b, respectively, are inherently so located. However, it is necessary to locate exhaust ports 44b toward narrow end 52 of return slots 42b and exhaust ports 44a in an elongated portion 54 of return slots 42a in order to keep them away from high intensity hydraulic fluid flow jets issuing from first and second return flow selective control orifices 49a and 49b, respectively, and first and second return flow control orifices 48a and 48b, respectively, respectively.

FIGS. 3B and 3C depict input slots 40a and 40b, and return slots 42a and 42b deflected toward the left and right, respectively. As shown in FIGS. 3B and 3C, deflection is sufficient to effect complete closure of respective sets of input and return flow selective control orifices 47b and 47a, and 49a and 49b, respectively, as would likely be the case when a parking maneuver is executed. In this case all of the hydraulic fluid flows through the input and return flow control orifices 46a and 46b, and 48a and 48b, respectively.

Figure 4A:
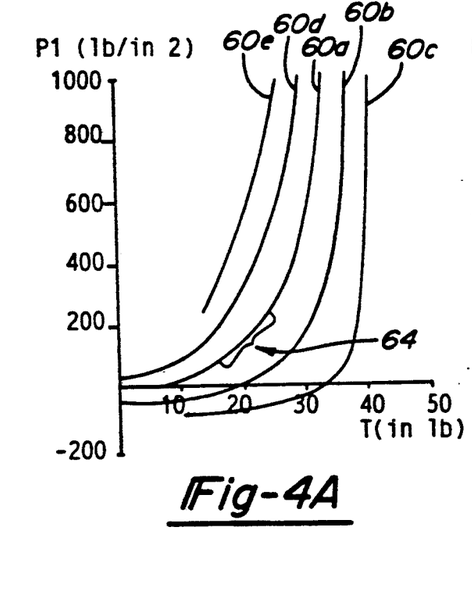
FIGS. 4A and 4B are comparative graphs comprising sets of curves depicting static and dynamic output pressure-effort characteristics of the improved valving sub-assembly of FIG. 1 and a conventional valving sub-assembly, respectively.
Figure 4B:
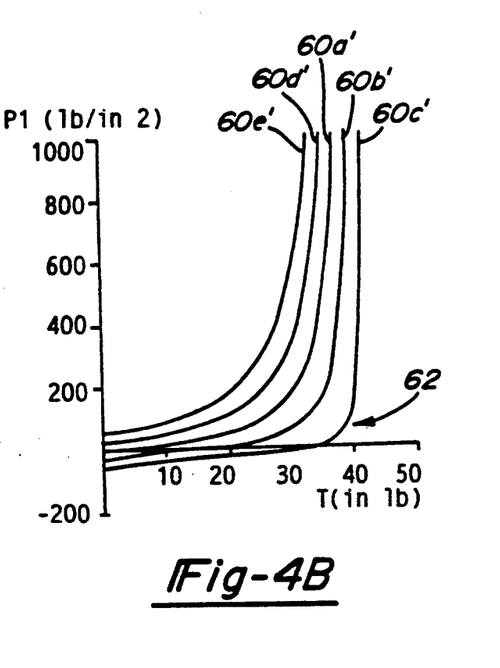

Shown in FIGS. 4A and 4B are comparative graphs comprising sets of curves depicting static and dynamic output pressure-effort characteristics of a control valve comprising improved valving sub-assembly 10 and a conventional control valve, respectively. Since the curves depict similar operating conditions, they utilize the same alphanumeric designations in each graph but carry a prime in FIG. 4B. Curves 60a and 60a' depict static behavior while curves 60b, 60b', 60c and 60c' depict dynamic behavior for positive one and two turns per second of the host vehicle's steering wheel, respectively, and curves 60d, 60d', 60e and 60e' depict dynamic behavior for negative one and two turns per second of the host vehicle's steering wheel, respectively.

Although each valve is configured to handle the same flow with the same back pressure when centered, the two sets of curves can be seen to differ widely. For instance, all the curves in FIG. 4B are dominated by significant "knee" portions shown in region 62. The result is a significant lack of modulation with respect to steering loads encountered during normal operation of the host vehicle. On the other hand, curve 60a in FIG. 4A depicts significant output pressure gain at less than 10 [in. lb] of steering effort. Further, there is a quasi-linear region in the static output pressure-effort curve 60a as indicated by region 64 which results in virtually ideal levels of steering load modulation. And, there is a significant lateral spreading of the curves 60a, 60b, 60c, 60d and 60e with respect to level of steering effort. This indicates significantly increased values of mechanical input impedance as defined by the ratio of applied steering effort to steering wheel rotational velocity. Operationally, the host vehicle behaves as though a damper was placed in parallel with the steering system and a significant improvement in steering stability is noted by the driver.

Figure 5:
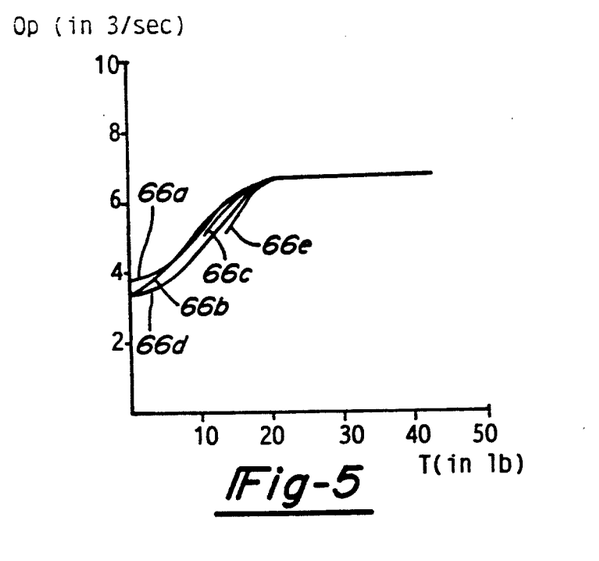
FIG. 5 is a graph depicting primary portions of hydraulic fluid flowing through output slots of the improved valving sub-assembly of FIG. 1 for a range of operating conditions.

However, it is important to note that the higher output flow rates are not available at low levels of applied steering effort. This is shown in FIG. 5 wherein primary flow through the input and return flow control orifices 46a and 46b, and 48a and 48b, respectively, is plotted as a function of applied steering effort for each load flow rate. Consistent with the alphanumeric designations above, curve 66a depicts static behavior while curves 66b and 66c depict dynamic behavior for positive one and two turns per second of the host vehicle's steering wheel, respectively, and curves 66d and 66e depict dynamic behavior for negative one and two turns per second of the host vehicle's steering wheel, respectively. Above about 21 [in. lb] all hydraulic fluid flow is through the primary flow path as one of each set of input and return flow selective control orifices 47a and 47b, and 49a and 49b, respectively, is completely closed. It can be seen that curves 66c and 66e terminate at levels of flow equal to that required for plus and minus 2 [rev/sec], respectively, whereat primary hydraulic fluid flow is just sufficient to support load flow. This problem can be substantially eliminated by introducing an alternate flow path between output slots 24a and 24b as will be described below.

Figure 6A:
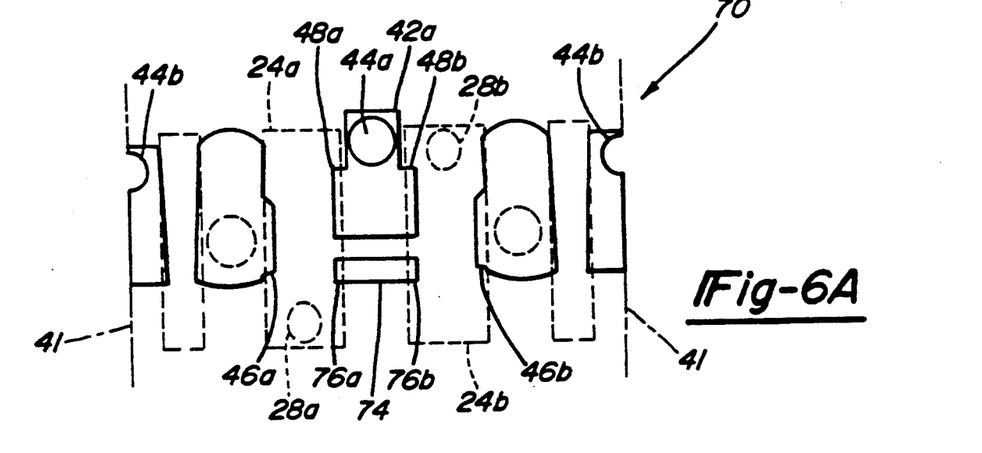
FIGS. 6A and 6B are descriptive drawings illustrating configurations of input slots, output slots, diversionary slots, return slots and parasitic slots utilized in another improved valving sub-assembly according to a second preferred embodiment of the present invention.
Figure 6B:
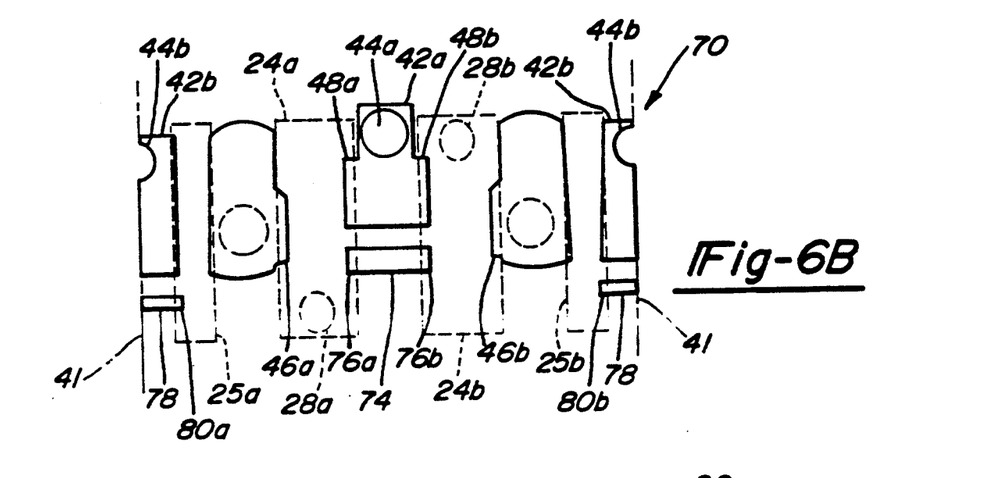

With reference now to FIGS. 6A and 6B of the drawings, the relative relationship of various slots and orifices described above is descriptively shown in developed views depicting either symmetrical half (i.e., portions either above or below plane 41) of an open-center improved valving sub-assembly 70 comprising a valve spool 72 in place of valve spool 12 according to the second preferred embodiment of the present invention is shown. In valve spool 72 parasitic slots 74 are positioned in parallel with the return slots 42a. Shown in FIG. 6A are all of the various slots and orifices described previously. However, return slots 42a and exhaust ports 44a are relocated axially to accommodate parasitic slots 74 in such a manner that first and second output ports 28a and 28b, respectively, and exhaust ports 44a and 44b are not subject to high intensity hydraulic fluid flow jets issuing from any of the orifices including parasitic orifices 76a and 76b. The parasitic orifices 76a and 76b comprise overlapping areas between parasitic slots 74 and output slots 24a and 24b, respectively.

Operationally, parasitic flow through the parasitic slots 74 allows extra flow between output slots 24a and 24b in either direction. Usually the parasitic slots 74 are formed so that parasitic orifices 76a or 76b close along with input flow control orifices 46b or 46a, respectively, and/or return flow control orifices 48a or 48b, respectively, in order to minimize orifice flow velocities and therefore minimize valve noise. The effect of adding the parasitic slots 74 is to push all of the curves shown in FIG. 4A somewhat toward the right and to allow extra load flow at low levels of applied steering effort. In pushing the curves toward the right, the threshold of meaningful load pressure gain is offset toward a higher value of applied steering effort.

The presence of the parasitic slots also results in significantly improved centering of the steering wheel after a turn. The reason for this is quite simple. The parasitic slots provide a direct path for hydraulic fluid flowing from one side of the host vehicle's power cylinder to the other. In a power steering system not comprising parasitic slots, the only flow path for such hydraulic fluid is through its main control orifices and pumping system. On a comparative basis, such systems seem to suffer from a quasi-hydraulic lock of their power cylinders.

Parasitic orifice sizes are chosen so that they will conduct the additional hydraulic fluid required with an acceptable differential load pressure between output slots 24a and 24b. For instance, in the example shown in FIGS. 4A and 5 it might be desirable to allow a supplemental parasitic flow of 2[in3/sec] on center at a differential load pressure of 50[lb/in2]. This can be accomplished by implementing the following formula:

$$A_p = (|Q_p|/(n \sin \theta C_d))(\rho/P_L)$$

where $A_p$ is the on center area of each of the parasitic orifices, $Q_p$ is the desired parasitic flow (or 2[in3/sec] for this case), n is the number of parasitic slots (two for this case), sin $\theta$ is the Sine of the angle of the issuing surfaces of the various slots (approximately 45[deg] for the slots shown in FIGS. 1 and 3), $C_d$ is the discharge coefficient (about 0.75 for $\theta = 45$[deg]), $\pi$ is the hydraulic fluid density (about 0.000078[lb.sec2/in4]) and $P_L$ is the desired pressure drop (50[lb/in2] for this case). Thus, an appropriate orifice size might be about 0.0024[in2]. Since the tangential opening dimension of the parasitic slots is about 0.024[in], their width is about 0.100[in].

If even more rightward offsetting of this threshold of meaningful load pressure gain is required without further lateral compression of the bundle of pressure-applied effort curves, then additional parasitic slots 78 can be introduced in parallel with return slots 42b as depicted in FIG. 6B. As before, additional parasitic slots 78 and diversionary slots 25a and 25b. This has the effect of maintaining high levels of system damping due to slightly increased secondary flow. In this case all of the parasitic slots are usually sized and located such that either set of parasitic and additional parasitic orifices 76a and 80b, or 76b and 80a, respectively, along with input flow control orifices 46b or 46a, respectively, and/or return flow control orifices 48a or 48b, respectively, close simultaneously in order to minimize valve noise.

Figure 7:
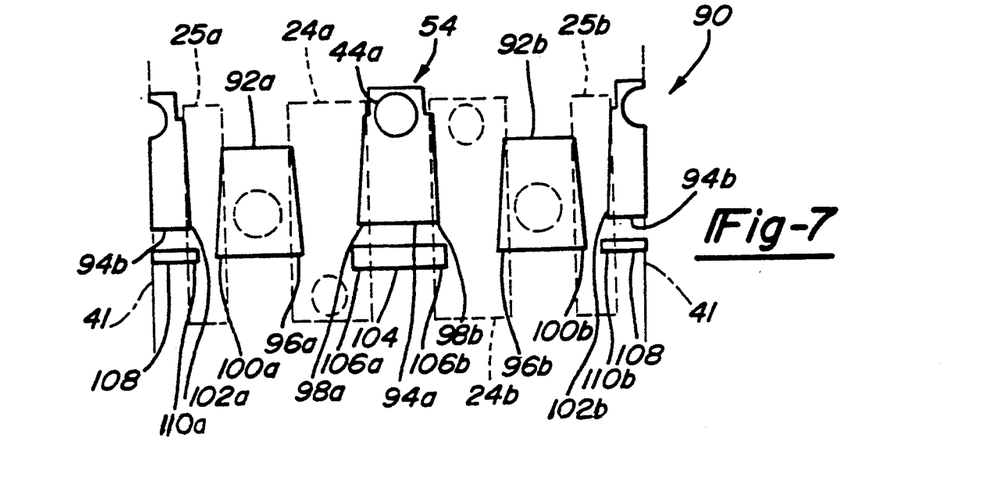
FIG. 7 is a descriptive drawing illustrating configurations of input slots, output slots, diversionary slots, return slots and parasitic slots utilized in still another improved valving sub-assembly according to a third preferred embodiment of the present invention.

Of course, control valves having parallel diversionary slots can be implemented with other types of control orifices and still remain within the scope of the present invention. For instance, with reference to FIG. 7 of the drawings, an open-center improved valving sub-assembly 90 comprising input and return slots 92a and 92b, and 94a and 94b, respectively, that are physically identical except for elongated portion 54 which is again utilized to locate exhaust ports 44a away from high intensity hydraulic fluid jets issuing from either one of return flow control orifices 98a or 98b. Input and return slots 92a and 92b, and 94a and 94b, respectively, are generally configured so that their closure rates are of order higher than one as is shown in FIG. 7. In fact, they are shown configured with curvilinear edges such that their closure rates are approximately of order 2.5.

In improved valving sub-assembly 90, output slots 24a and 24b, and diversionary slots 25a and 25b are utilized in a manner similar to that described above. However, their relative positions in the tangential direction are offset slightly such that input and return flow control orifices 96a and 96b, and 98a and 98b, respectively, comprise slightly larger overlapping areas than input and return flow selective control orifices 100a and 100b, and 102a and 102b, respectively. Parasitic slots 104 are disposed parallel to return slots 94a whereby parasitic orifices 106a and 106b comprise overlapping areas as before. If also utilized, additional parasitic slots 108 are disposed parallel to return slots 94b whereby additional parasitic orifices 110a and 110b also comprise overlapping areas. All of the parasitic slots are usually sized and located such that either set of parasitic and additional parasitic orifices 106a and 110b, or 106b and 110a, respectively, closes simultaneously in order to minimize valve noise. The operation of improved valving sub-assembly 90 is similar to that of the improved valving sub-assembles 10 and 70. However, the resulting families of output pressure-applied effort curves generally have gentler transitions without the quasilinear regions depicted in FIG. 4A.

Figure 8A:
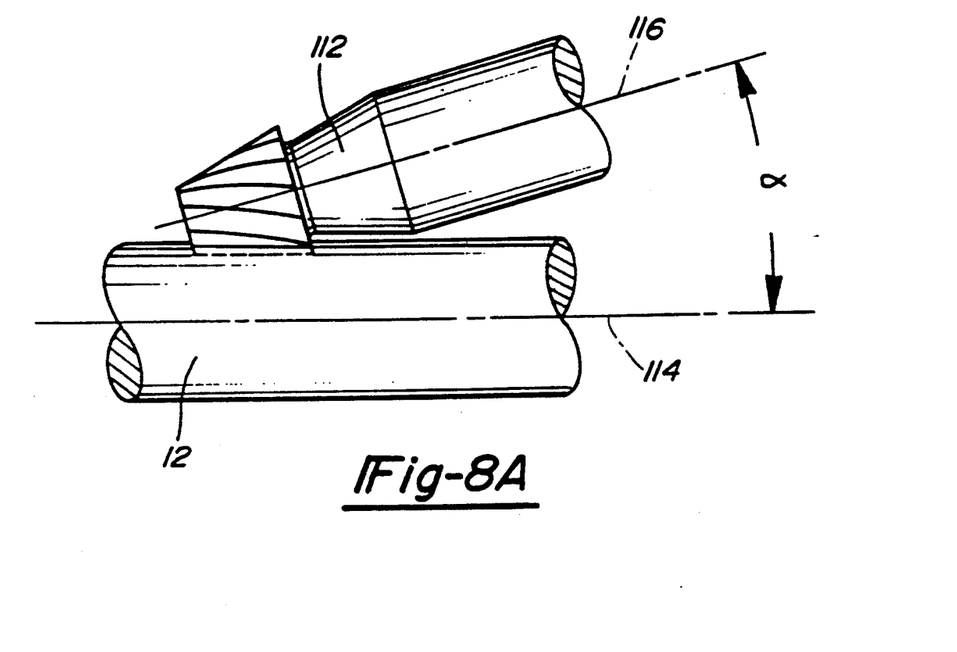
FIGS. 8A and 8B are drawings depicting machining operations utilized in forming various slots comprised in valve spool members of the improved valving sub-assemblies mentioned above.

Generally, each one of the input and return slots 40a and 40b, and 42a and 42b, respectively, parasitic slots 74, additional parasitic slots 78, input and return slots 92a and 92b, and 94a and 94b, respectively, parasitic slots 104 and additional parasitic slots 108 are formed with a transverse geometry similar to that of a woodruff key slot formed transversely. Other than the input slots 40a and 40b, all are formed with symmetrical edges and may be cut by a milling cutter 112 whose cutting edges are formed in a geometrically compatible manner. However, the slots are generally located toward the middle of the valve spool 12. Because this would involve impractical ratios of cutter shank length to diameter, it is not desirable to utilize such a milling cutter 112 in a machining axis located parallel to center-line 114 of the valve spool 12. For this reason machining axis 116 is normally located at an angle $\alpha$ such as 15[deg] with respect to axis 114 as shown in FIG. 8A.

Figure 8B:
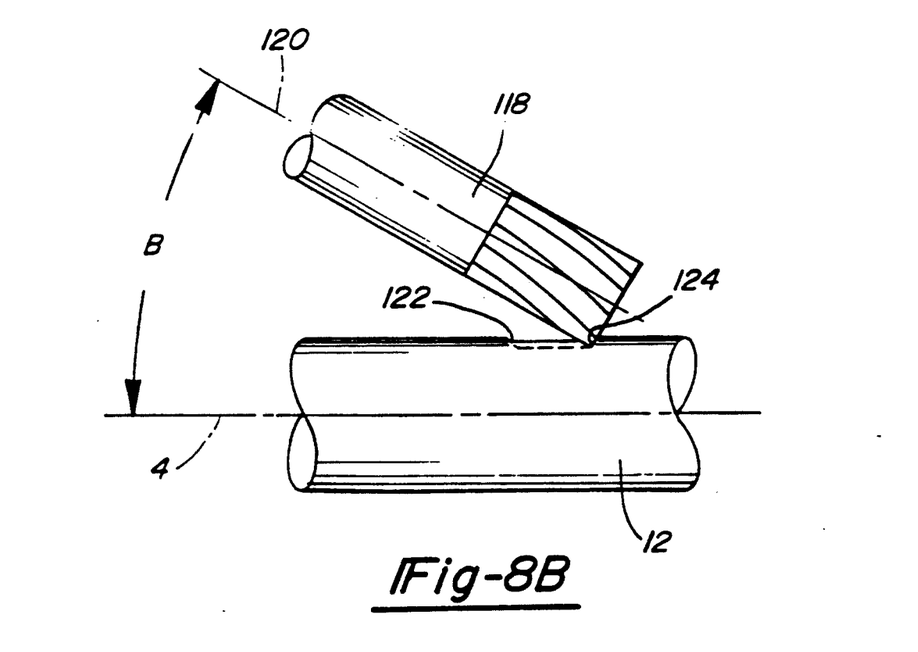

Input slots 40a and 40b, which are not symmetric, are generally formed by traversing an end mill 118 similarly held in a machining axis 120 at an angle $\beta$ as shown in FIG. 8B. In this case the cutting action of the end mill 118 forms ends of input slots 40a and 40b that are not straight as depicted by indicators at 122 and 124 in both FIGS. 3A and 8A. Because it is desirable to keep the end located at indicator 122 reasonably short, the angle $\beta$ is usually larger that the angle $\alpha$. In FIG. 8B the angle $\beta$ is shown as being approximately 30[deg]. In any case, the machining path utilized in forming input slots 20a and 20b is nominally bifurcated to sequentially generate each edge contour and can be controlled via CNC techniques.

Because each vehicle chassis is set up differently with differing amounts of caster, vehicle weight, tire type and the like, there is no one solution to power steering problems for all vehicles. However, the versatility demonstrated by the range of design capabilities described above makes possible the implementation of viable steering solutions to a wide range of vehicles within the scope of the present invention. Additionally, it should be noted that the various detail modifications to the slot configurations mentioned above can be made and still be within the scope of the present invention. For instance, the order of the various input and return slots could be inverted. Or, inverted porting could be implemented by locating the various input and return slots in the valve sleeve and the various output and diversionary slots in the valve spool. In any case, the foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claim.

What is claimed is:

1. An open-center improved valving sub-assembly of the type used for power steering systems for motor vehicles, comprising:

a valve spool member having first and second sets of input slots and first and second sets of return slots, a valve sleeve member circumferentially disposed about said valve spool member and having output slots linked fluidically to said first set of input slots by input flow control orifices comprising overlapping tangentially disposed areas therebetween and to said first set of return slots by return flow control orifices comprising overlapping tangentially disposed areas therebetween, and diversionary slots linked fluidically to said second set of input slots by input flow selective control orifices comprising overlapping tangentially disposed areas therebetween and to said second set of return slots by return flow selective control orifices comprising overlapping tangentially disposed areas therebetween wherein, said input flow selective control orifices and said return flow selective control orifices are tangentially shorter in length than said input flow control orifices and said return flow control orifices whereby a first set of said input flow selective control orifices and said return flow selective control orifices closes before a corresponding first set of said input flow control orifices and said return flow control orifices as the valve spool member is moved in a first rotational direction with respect to the valve sleeve member and a second set of said input flow selective control orifices and said return flow selective control orifices closes before a corresponding second set of said input flow control orifices and said return flow control orifices as the valve spool member is moved in the opposite rotational direction with respect to the valve sleeve member.

* * * * *